(12) United States Patent
Yadav et al.

(10) Patent No.: US 7,962,698 B1
(45) Date of Patent: Jun. 14, 2011

(54) DETERMINISTIC COLLISION DETECTION

(75) Inventors: Rishi Yadav, Hudson, NH (US); Alan Refalo, Gloucester, MA (US)

(73) Assignee: Cypress Semiconductor Corporation, San Jose, CA (US)

( * ) Notice: Subject to any disclaimer, the term of this patent is extended or adjusted under 35 U.S.C. 154(b) by 497 days.

(21) Appl. No.: 11/523,503

(22) Filed: Sep. 18, 2006

Related U.S. Application Data

(60) Provisional application No. 60/723,429, filed on Oct. 3, 2005.

(51) Int. Cl.
 *G06F 12/00* (2006.01)
(52) U.S. Cl. ....................................................... 711/149
(58) Field of Classification Search .................. None
 See application file for complete search history.

(56) References Cited

U.S. PATENT DOCUMENTS

| | | | |
|---|---|---|---|
| 3,931,613 A | 1/1976 | Gruner et al. | |
| 4,393,482 A | 7/1983 | Yamada | |
| 4,445,172 A | 4/1984 | Peters et al. | |
| 4,493,033 A | 1/1985 | Ziegler et al. | |
| 4,677,594 A | 6/1987 | Bisotto et al. | |
| 4,755,936 A | 7/1988 | Stewart et al. | |
| 4,901,228 A | 2/1990 | Kodama | |
| 4,933,909 A | 6/1990 | Cushing et al. | |
| 4,967,398 A | 10/1990 | Jamoua et al. | |
| 5,187,783 A | 2/1993 | Mansfield et al. | |
| 5,222,223 A | 6/1993 | Webb, Jr. et al. | |
| 5,224,214 A | 6/1993 | Rosich | |
| 5,257,236 A | 10/1993 | Sharp | |
| 5,261,064 A | 11/1993 | Wyland | |
| 5,289,427 A | 2/1994 | Nicholes et al. | |
| 5,293,623 A | 3/1994 | Froniewski et al. | |
| 5,329,630 A | 7/1994 | Baldwin | |
| 5,367,650 A | 11/1994 | Sharangpani et al. | |
| 5,398,211 A | 3/1995 | Willenz et al. | |
| 5,424,995 A | 6/1995 | Miyazaki et al. | |
| 5,459,851 A | 10/1995 | Nakajima et al. | |
| 5,469,544 A | 11/1995 | Aatresh et al. | |
| 5,497,470 A | 3/1996 | Liencres | |
| 5,502,683 A | 3/1996 | Marchioro | |
| 5,526,316 A | 6/1996 | Lin | |
| 5,530,842 A * | 6/1996 | Abraham et al. | ............. 709/221 |
| 5,534,796 A | 7/1996 | Edwards | |
| 5,557,768 A | 9/1996 | Braceras et al. | |
| 5,566,124 A | 10/1996 | Fudeyasu et al. | |
| 5,661,692 A | 8/1997 | Pinkham et al. | |

(Continued)

OTHER PUBLICATIONS

U.S. Appl. No. 11/523,419: "Collision Detection Mechanism for High-Speed DDR," Yadav et al.; 34 pages.

(Continued)

*Primary Examiner* — Hiep T Nguyen

(57) ABSTRACT

An embodiment of the present invention is directed to a method of deterministic collision detection involving at least two ports. The method includes receiving a read/write operation at a first data rate at a first port of a multi-port device, receiving a read/write operation at a second data rate at a second port of the multi-port device, detecting a collision between the first port and the second port if a same address space is accessed by the first port and the second port coincidentally, asserting a busy signal at least one of said first port and said second port a number of clock cycles after detecting said collision, storing an address location of said address space in a memory register, and deterministically report the collision using the address location and the number of clock cycles.

22 Claims, 8 Drawing Sheets

U.S. PATENT DOCUMENTS

| | | | |
|---|---|---|---|
| 5,668,967 | A | 9/1997 | Olson et al. |
| 5,673,415 | A | 9/1997 | Nguyen et al. |
| 5,680,542 | A | 10/1997 | Mulchandani et al. |
| 5,748,968 | A | 5/1998 | Nally et al. |
| 5,752,260 | A | 5/1998 | Liu |
| 5,752,270 | A | 5/1998 | Wada |
| 5,768,211 | A | 6/1998 | Jones et al. |
| 5,781,480 | A * | 7/1998 | Nogle et al. ............. 365/189.04 |
| 5,787,489 | A | 7/1998 | Pawlowski |
| 5,875,346 | A | 2/1999 | Luick |
| 5,956,748 | A | 9/1999 | New |
| 5,999,317 | A | 12/1999 | Sartore et al. |
| 6,021,480 | A | 2/2000 | Pettey |
| 6,065,107 | A | 5/2000 | Luick |
| 6,087,527 | A | 7/2000 | Roth et al. |
| 6,094,532 | A | 7/2000 | Acton et al. |
| 6,125,421 | A | 9/2000 | Roy |
| 6,167,487 | A | 12/2000 | Camacho et al. |
| 6,181,595 | B1 | 1/2001 | Hawkins et al. |
| 6,256,256 | B1 | 7/2001 | Rao |
| 6,345,335 | B1 | 2/2002 | Flynn |
| 6,360,307 | B1 | 3/2002 | Raftery et al. |
| 6,388,939 | B1 | 5/2002 | Manapat et al. |
| 6,532,524 | B1 | 3/2003 | Fan et al. |
| 6,545,935 | B1 | 4/2003 | Hsu et al. |
| 6,598,178 | B1 | 7/2003 | Yee et al. |
| 6,717,834 | B2 | 4/2004 | Zagorianakos et al. |
| 7,120,761 | B2 | 10/2006 | Matsuzaki et al. |
| 7,178,000 | B1 | 2/2007 | Dobecki |
| 7,363,436 | B1 * | 4/2008 | Yeh et al. ....................... 711/149 |
| 7,421,559 | B1 | 9/2008 | Yadav |
| 2007/0011388 | A1 | 1/2007 | Choi |

OTHER PUBLICATIONS

USPTO Notice of Allowance for U.S. Appl. No. 11/523,419 dated Apr. 3, 2009; 7 pages.

U.S. Appl. No. 11/015,959: "Apparatus and Method for a Synchronous Multi-Port Memory," Yadav; 44 pages.

USPTO Non-Final Rejection for U.S. Appl. No. 11/015,959 dated Feb. 7, 2007; 22 pages.

USPTO Final Rejection for U.S. Appl. No. 11/015,959 dated Aug. 10, 2007; 24 pages.

USPTO Non-Final Rejection for U.S. Appl. No. 11/015,959 dated Sep. 25, 2007; 16 pages.

USPTO Notice of Allowance for U.S. Appl. No. 11/015,959 dated May 1, 2008; 8 pages.

Endo et al; "Pipelined, Time-Sharing Access Technique for an Integrated Multiport Memory," IEEE Journal of Solid-State State Circuits, vol. 26, No. 4, Apr. 1991; 6 pages.

U.S. Appl. No. 09/633,514: "Dual Port SRAM," Manapat et al.; 40 pages.

U.S. Appl. No. 09/538,822: "Port Prioritization Scheme," Fan et al.; 22 pages.

USPTO Notice of Allowance for U.S. Appl. No. 08/688,904 dated Jul. 8, 1997; 3 pages.

USPTO Non-Final Rejection for U.S. Appl. No. 08/688,904 dated Feb. 6, 1997; 5 pages.

USPTO Notice of Allowance for U.S. Appl. No. 09/099,915 dated May 21, 2001; 4 pages.

USPTO Non-Final Rejection for U.S. Appl. No. 09/099,915 dated Nov. 9, 2000; 7 pages.

USPTO Non-Final Rejection for U.S. Appl. No. 09/099,915 dated Mar. 16, 2000, 8 pages.

USPTO Notice of Allowance for U.S. Appl. No. 09/633,514 dated Aug. 30, 2001; 2 pages.

USPTO Non-Final Rejection for U.S. Appl. No. 09/633,514 dated Mar. 29, 2001; 8 pages.

USPTO Notice of Allowance for U.S. Appl. No. 09/538,822 dated Oct. 18, 2002; 3 pages.

USPTO Final Rejection for U.S. Appl. No. 09/538,822 dated Aug. 22, 2002; 7 pages.

USPTO Non-Final Rejection for U.S. Appl. No. 09/538,822 dated Mar. 28, 2002; 6 pages.

Alves et al., "Built-In Self-Test for Multi-port RAMs" Written in 1991, IEEE. pp. 248-251; 4 pages.

Crawford et al., "Cache Coherence in a Multiport Memory Environment," Written in 1994, IEEE, pp. 632-642; 11 pages.

"16K × 8/9 Dual-Port Static RAM with Sem, Int, Busy," Cypress Semiconductor Data Book, May 1995, CY7C006 and CY7C016, pp. 6:1-17; 10 pages.

"4K × 16/18 and 8K × 16/18 Dual-Port Static RAM with Sem, Int, Busy," Cypress Semiconductor Data Book, May 1995, CY7CO24/0241 and CY7CO25/0251, pp. 6:18-36; 11 pages.

"1K × 8 Dual-Port Static RAM," Cypress Semiconductor Data Book, May 1995, CY7C130/CY7C131 and CY7C140/CY7C141, pp. 6:37-49; 8 pages.

"2K × 8 Dual-Port Static RAM," Cypress Semiconductor Data Book, May 1995, CY7C132/CY7C136 and CY7C1421/CY7C146, pp. 6:50-62; 8 pages.

"2K × 16 Dual-Port Static RAM," Cypress Semiconductor Data Book, May 1995, CY7C133 and CY7C143, pp. 6:63-73; 7 pages.

"4K × 8 Dual-Port Static RAM and 4K × 8 Dual-Port Static Ram with Semaphores," Cypress Semiconductor Data Book, May 1995, CY7B134 and CY7B135 and CY7B1342, pp. 6:74-86; 8 pages.

"4K × 8/9 Dual-Port Static RAM with Sem, Int, Busy," Cypress Semiconductor Data Book, May 1995, CY7B138 and CY7B139, pp. 6:87-102; 10 pages.

"8K × 8/9 Dual-Port Static RAM with Sem, Int, Busy," Cypress Semiconductor Data Book, May 1995, CY7B144 and CY7B145, pp. 6:103-120; 11 pages.

USPTO Non-Final Rejection for U.S. Appl. No. 11/523,419 dated Aug. 17, 2009; 7 pages.

* cited by examiner

DETERMINISTIC COLLISION DETECTION

CLAIM OF PRIORITY UNDER 35 U.S.C. §119

The present Application for Patent claims priority to Provisional Application No. 60/723,429 entitled "A DETERMINISTIC COLLISION DETECTION MECHANISM" filed Oct. 3, 2005, and assigned to the assignee hereof and hereby expressly incorporated by reference herein.

REFERENCE TO CO-PENDING APPLICATIONS FOR PATENT

The present Application for Patent is related to the following co-pending U.S. Patent Applications Ser. No. 11/523,419:
"A Collision Detection Mechanism for High-Speed DDR" by Rishi Yadav and Alan Refalo, filed concurrently herewith, assigned to the assignee hereof, and expressly incorporated by reference herein.

BACKGROUND

Multi-port devices support collision detection to flag any coincident memory accesses, also known as collisions, between independent ports that can possibly result in corrupt or unexpected data being accessed from them. For example, in a dual-port memory, if port A is reading location x000 and port B is writing to the same location at the same time, data read on port A may be incorrect. The collision detection operates by identifying timing for each port's access to the memory and raising a flag to each port whenever it sees a possibility of data corruption. In a synchronous memory, each clock cycle is divided into two sections. In the first part, the memory is accessed and in the later part, the memory recovers and gets ready for next access.

Since no blocking of writes is performed through collision detection, a reading port is always flagged (named BUSY flag) irrespective of its arrival with respect to a writing port. In the earlier example, port A will always be flagged as reading possibly corrupt data. FIG. 1 is a timing diagram 100 illustrating a write-read condition with overlapping memory access. CLK represents the respective port's clock, ADDR is the address bus, RW is read when high and is write when low, and BUSY is an active-low output collision flag. CLK, ADDR, and RW are inputs per port, while BUSY is an output. All signals are synchronous with respect to their own port's clock. For a given port, the address and read/write control at the rising edge of the port's clock is used by the memory. In the case of FIG. 1, a collision between ports A and B is experienced at the second rising edge of CLK_A at memory address MATCH. Since port A is reading and port B is writing, port A is flagged BUSY.

If both ports are writing, the choice becomes more involved. If both writing ports access the memory core at the same time, data may not belong to any specific port in that location. In this case, both ports are flagged. FIG. 2 shows a timing diagram 200 illustrating a write-write condition with overlapping memory access. ACCESS is the internal memory access pulse. When this signal is high, internal memory access is occurring and when low, the previous access is completed and the memory is recovering. "Collision" shows the overlap of internal memory access pulses of port A and port B for the memory address MATCH. Since both ports are writing, both ports are flagged BUSY. Furthermore, when memory accesses are non-overlapping but the clock cycle times are violated (both ports access the same address with overlap in cycle time), the earlier port is flagged.

However, conventional technology does not allow for collision detection to be deterministic. That is, it is not capable of signaling to the system, user, etc., specifically where the collision occurred and during what particular clock cycle. This is due to the fact that previous detection mechanisms use sequential elements (e.g., flip-flops) clocked by that port's clock to capture the BUSY flag. Since a flip-flop has a requirement of both a setup time and a hold time, it might not capture the desired value in the same cycle if either requirement is violated. Since the input signal for the flip-flop is generated by comparing addresses from independent asynchronous domains (ports), the capture of this signal is not guaranteed if it changes with respect to the other port's clock. Therefore, there is a degree of uncertainty as to during which cycle a collision actually occurred. FIG. 3 shows a timing diagram 300 for the write-write condition with overlapping clock cycles described above. In this case, the detection of the collision may not be deterministic using previous technology.

For example, if port A wrote to location x0000 and port B is writing the same location with cycle time overlap, port A will be flagged. However, if port B starts writing x0000 just when port A's cycle is ending (cycle overlap time is small), it may be possible that port A's flag is not asserted or, in worst case, is not at a specific logic voltage level for an extended amount of time (also known as meta-stable condition). As described above, this condition has a setup time requirement for the later arriving port with respect to the end of the cycle of the earlier arriving port in order to detect a collision. This scenario is likely to violate the setup time requirement. Since collision detection needs to operate for successive cycles, a standard logic synchronizer would have resolved the meta-stability issue, but a cycle of uncertainty would persist nonetheless. For example, when a port is flagged through a 2-stage synchronizer, it is not possible to state whether the collision occurred 2 cycles prior or 3 cycles prior. Thus, the collision detection is indeterminate.

SUMMARY

Embodiments of the present invention are directed to a methods and circuits of deterministic collision detection involving at least two ports. The method includes receiving a read/write operation at a first data rate at a first port of a multi-port device, receiving a read/write operation at a second data rate at a second port of the multi-port device, detecting a collision between the first port and the second port if a same address space is accessed by the first port and the second port coincidentally, asserting a busy signal at least one of the first port and the second port a number of clock cycles after detecting the collision, storing an address location of the address space in a memory register, and deterministically reporting the collision using the address location and the number of clock cycles.

Another embodiment of the present invention is directed to a method of deterministically detecting collisions involving at least two ports. The method includes receiving a first read/write operation at a first data rate at a first port of a multi-port memory, receiving a second read/write operation at a second data rate at a second port of the multi-port memory, detecting a collision between the first port and the second port if a same address space is accessed by the first port and the second port coincidentally, asserting a busy signal at the first port and the second port a number of clock cycles after detecting the collision if the first port is attempting to coincidentally write to the address space and the second port is attempting to write to the address space, asserting a busy signal at the first port and the second port a number of clock cycles after detecting the collision if the first port is attempting to write to the address space and the second port is attempting to coincidentally write to the address space, and, provided any port has been asserted busy, storing an address location of the address space in a memory register and deterministically reporting the collision using the address location and the number of clock cycles.

Another embodiment of the present invention is directed to a circuit for detecting collisions involving at least two ports. The circuit includes a multi-port device for receiving read and write operations at a first port and a second port at a first data rate and a second data rate respectively and a detector coupled to the multi-port device. The detector is for detecting a collision between the first port and the second port if a same address space is accessed by the first port and the second port coincidentally. The circuit also includes a signal generator coupled to the detector. The signal generator is for asserting a busy signal at least one of the first port and the second port a number of clock cycles after detecting the collision. The detector is also for storing an address location of the address space in a memory register and for deterministically reporting the collision using the address location and the number of clock cycles.

Another embodiment of the present invention is directed to a circuit for detecting collisions involving at least two ports. The circuit includes a multi-port device for receiving read and write operations at a first port and a second port at a first data rate and a second data rate respectively and a detector coupled to the multi-port device. The detector detects a collision between the first port and the second port if a same address space is accessed by the first port and the second port coincidentally. The circuit also includes a signal generator coupled to the detector. The signal generator is for asserting a busy signal at the first port a number of clock cycles after detecting the collision if the first port is attempting to read from the address space and the second port is attempting to coincidentally write to the address space, and for asserting a busy signal at the first port and the second port the number of clock cycles after detecting the collision if the first port is attempting to write to the address space and the second port is attempting to coincidentally write to the address space. The detector is also for storing an address location of the address space in the multi-port device and deterministically report the collision using the address location and the number of clock cycles, provided any port has been asserted busy.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to the preferred embodiments of the present invention, examples of which are illustrated in the accompanying drawings. While the present invention will be described in conjunction with the preferred embodiments, it will be understood that they are not intended to limit the invention to these embodiments. On the contrary, the present invention is intended to cover alternatives, modifications and equivalents, which may be included within the spirit and scope of the present invention as defined by the claims. Furthermore, in the detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Embodiments of the present invention provide for deterministic detection of data collisions. This is achieved by removing the above-mentioned setup time requirement. Embodiments further allow for a collision to be flagged to the associated ports in a deterministic fashion.

In various embodiments, the problems for signaling deterministic busy on consecutive cycles are addressed, for example, by dividing the clock frequency by 2 and generating 2 out-of-phase clocks. Clock cycles for a given port can then be called belonging to odd or even numbered cycles of original clock. The logic high value on one divided clock, DIVCLK1, will correspond to even-numbered clock cycles on the original clock and logic low will correspond to odd-numbered clock cycles. The opposite is true for the other divided clock, DIVCLK2.

Figure 4:
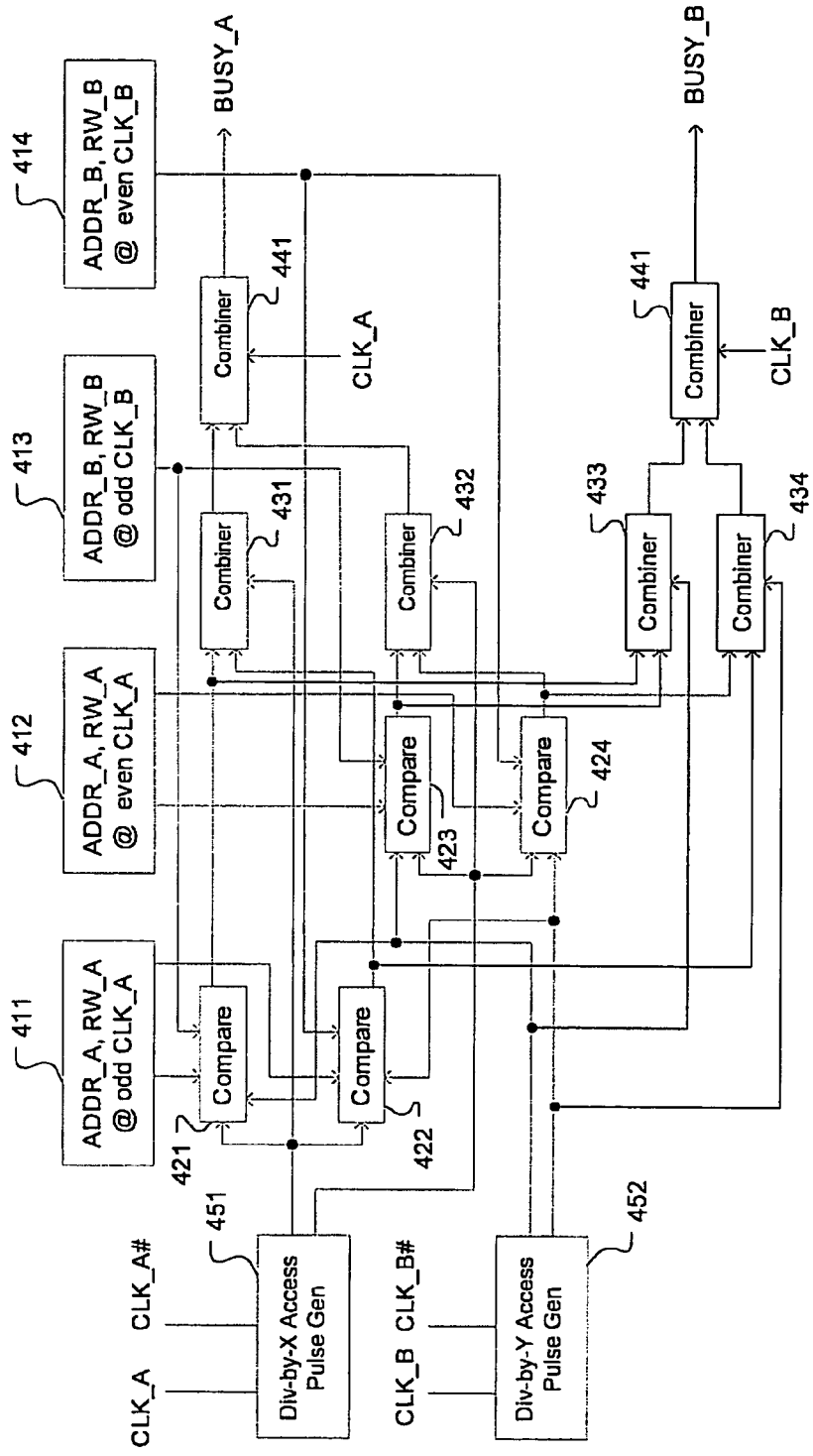
FIG. 4 is a block diagram of an exemplary circuit for detecting collisions deterministically, in accordance with various embodiments of the present invention.

FIG. 4 is a block diagram of an exemplary circuit 400 for detecting collisions deterministically, in accordance with various embodiments of the present invention. Pulse generators 451 and 452 read in CLK_A and CLK_B (and their complements) respectively. Pulse generator 451 in turn generates two divided clock signals for port A, DIVCLK1_A and DIVCLK2_A, and pulse generator 452 generates two divided clock signals for port B, DIVCLK1_B and DIVCLK2_B. Independent device accesses are generated per port for even and odd clock cycles. For example, an address belonging to an even-numbered cycle is captured by the rising edge of the port's respective DIVCLK1 and one belonging to an odd-numbered cycle is captured by the rising edge of the port's respective DIVCLK2. Address, write enable, and read enable statuses for odd and even cycles of ports A and B are maintained in memory registers 411-414. In other words, registers 411 and 412 maintain these values respectively for odd and even cycles at port A, and registers 413 and 414 maintain these values respectively for odd and even cycles at port B.

The values in registers 411-414 are compared by comparison circuits 421-424 to determine if there has been a collision. Since both ports have been split into even and odd cycles in the embodiment depicted in FIG. 4, there are thus four unique sets of data: odd cycles at port A, even cycles at port A, odd cycles at port B, and even cycles at port B. This configuration ensures that, for example, port A's collisions with port B are detected if port A occurs as both an early arriving port and a late arriving port. Thus, in one embodiment, the circuit comparing signals from both ports is repeated 4 times: odd cycles of port A are compared with odd cycles of port B (comparison circuit 421), odd cycles of port A are compared with even cycles of port B (comparison circuit 422), even cycles of port A are compared to odd cycles of port B (comparison circuit 423), and even cycles of port A are compared to even cycles of port B (comparison circuit 424).

Once the collision detection is performed for a port on both even and odd clock cycles, they are merged back into the original clock domain since divided clocks are synchronous to original clocks. These results are subsequently merged together by combiner circuits 431-434 and 441-442 to yield specific results for each port. For example, combiner circuit 431 merges the results for odd cycles at port A, combiner circuit 432 merges the results for even cycles at port A, and combiner circuit 441 merges the results of combiner circuits 431 and 432 to create a singular result for port A, and asserts/de-asserts BUSY_A accordingly. Combiner circuits 433-434 and 442 perform similar operations with respect to port B.

It should be appreciated that similar results may be achieved by dividing the primary clock (e.g., CLK_A) into X divided clocks, each having a frequency equal to the frequency of the primary clock divided by X. For example, for X=3, there would be three divided clocks, with the first corresponding to the first of every three cycles of the primary clock, the second corresponding to the second of every three cycles of the primary clock, and so on. In such a case, six data registers and nine comparison circuits would be required. It is further appreciated that similar results may be achieved if each port's clock is divided by a different integer (e.g., CLK_A is divided into X clocks and CLK_B is divided into Y clocks).

Figure 1:
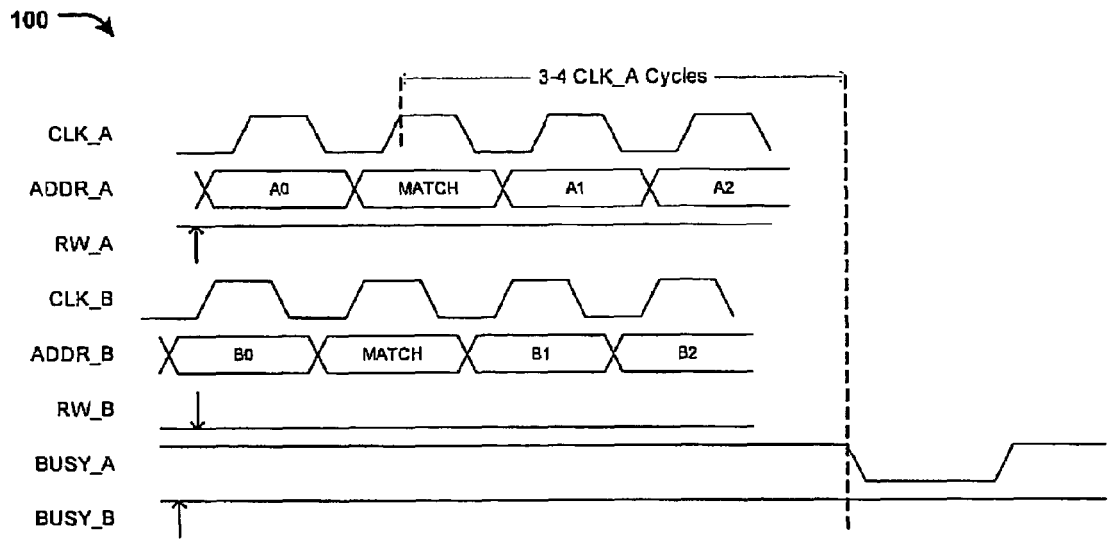
FIG. 1 is a timing diagram illustrating a write-read condition with overlapping memory access.
Figure 2:
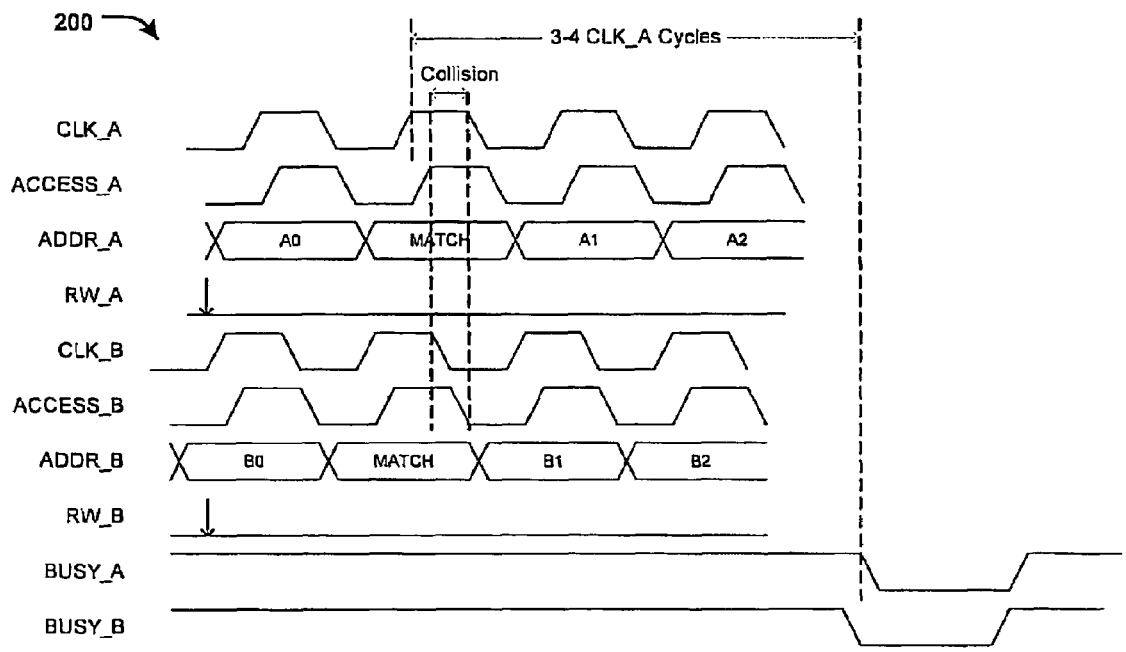
FIG. 2 shows a timing diagram illustrating a write-write condition with overlapping memory access.
Figure 3:
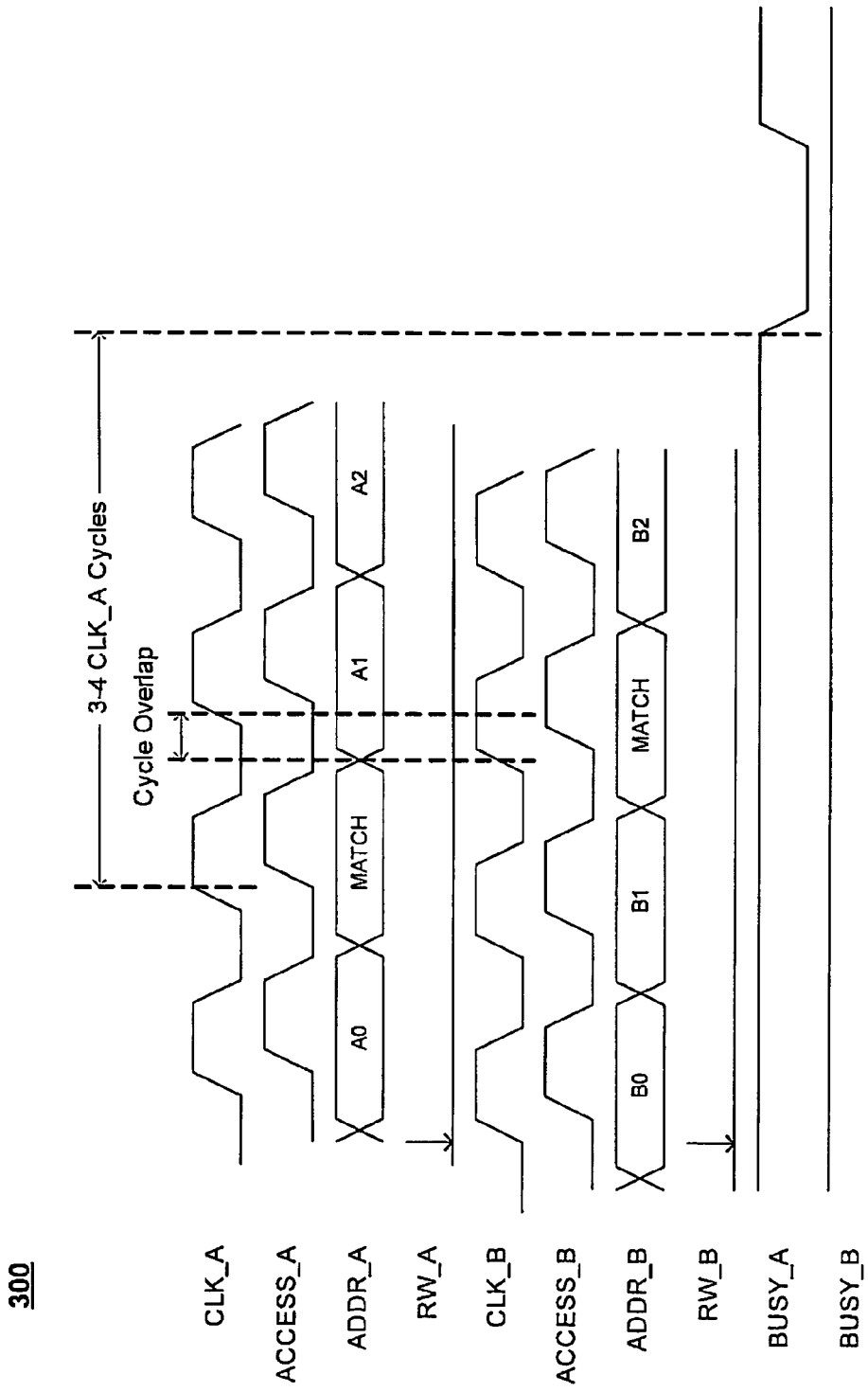
FIG. 3 shows a timing diagram for the write-write condition with overlapping clock cycles.
Figure 5:
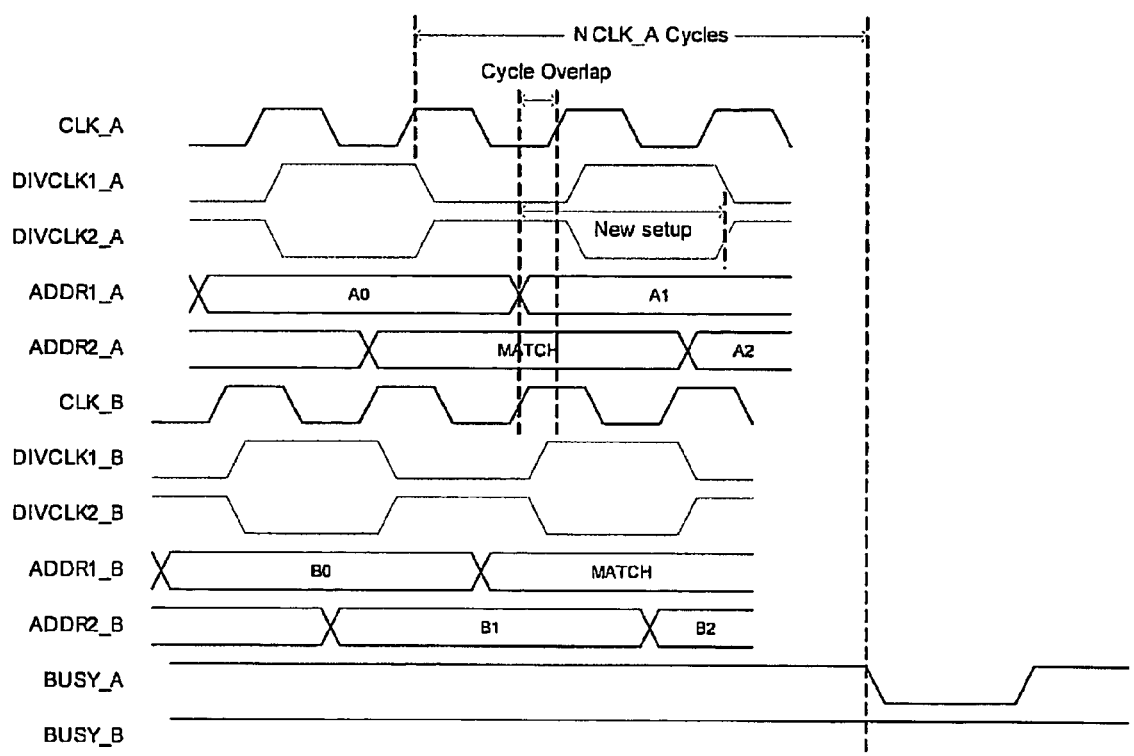
FIG. 5 shows a timing diagram illustrating deterministic collision detection, in accordance with various embodiments of the present invention.

FIG. 5 shows a timing diagram 500 illustrating deterministic collision detection, in accordance with various embodiments of the present invention. In FIG. 5, the sequence of addresses on port A is A0, MATCH, A1, A2, and so on. The register ADDR1_A stores the alternate addresses A0, A1, etc. with respect to DIVCLK1_A, while the register ADDR2_A stores MATCH, A2, etc. with respect to DIVCLK2_A. The read and write enables are stored accordingly before comparison. As soon as the MATCH address is clocked in the register ADDR1_A, it is compared to the contents of ADDR1_B and ADDR2_B. As in FIG. 1, if port A was reading and port B was writing, a true compare will result in the assertion of BUSY flag on port A. If both ports are writing, a compare is further qualified by device access pulse (not shown) being on/off. If the device access pulse for a particular port is off (i.e., that port has finished writing its data), it is flagged. Otherwise, both ports are flagged.

FIG. 5 specifically illustrates the case where there is a collision between ports A and B at address location MATCH, but there is not an actual overlap in access time. Thus, only BUSY_A is asserted (active-low in this example) because the data port A had written to MATCH was immediately overwritten by port B. In various embodiments, the access time overlap is detected by increasing the high time of each divided clock to account for any skew to the actual memory cells and also account for the minimum pulse width required to set the flag. This ensures a BUSY flag if there was a collision.

Figure 6:
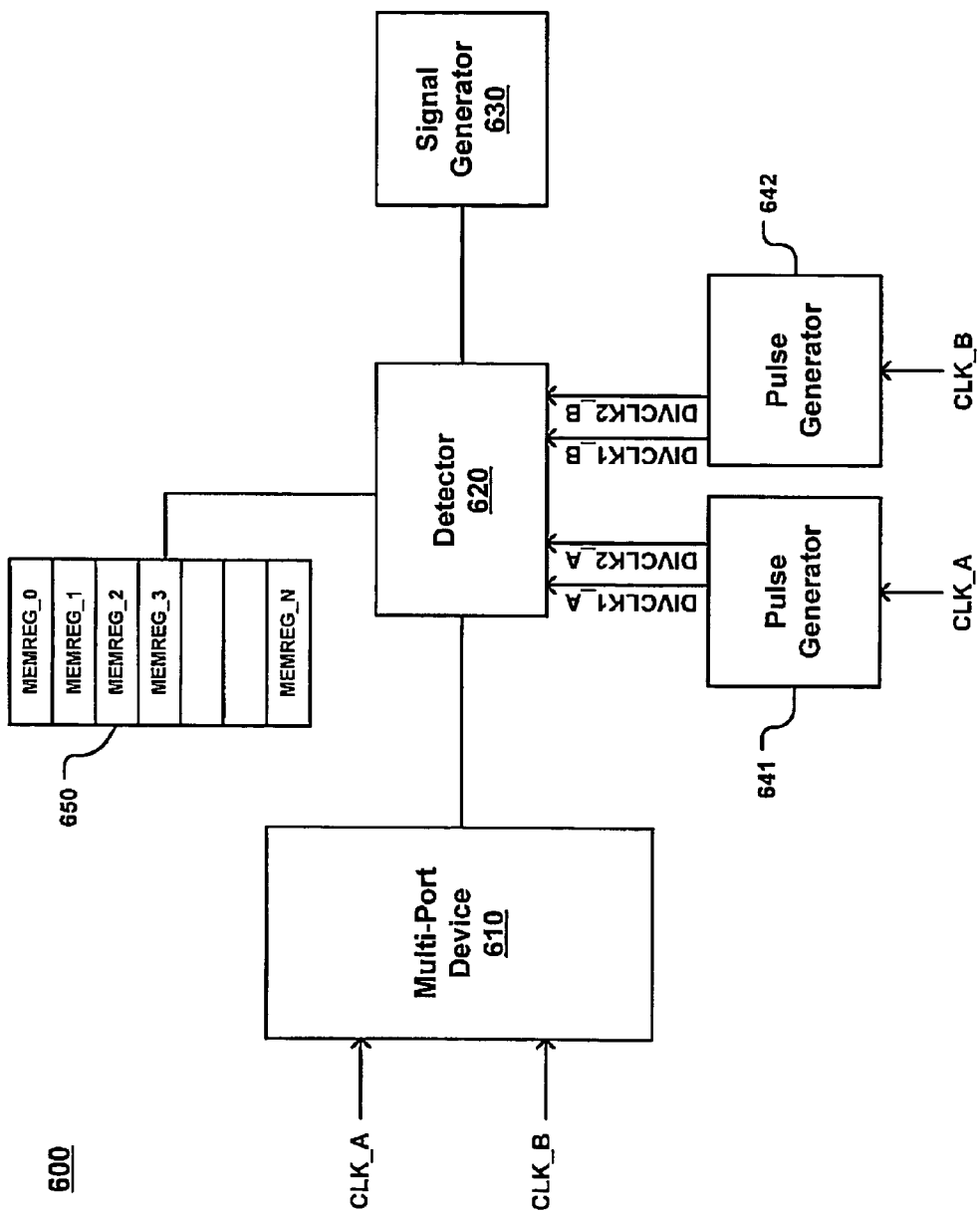
FIG. 6 illustrates a block diagram of an exemplary for deterministic collision detection, in accordance with various embodiments of the present invention.

FIG. 6 illustrates an exemplary block diagram of a circuit 600 for deterministic collision detection, in accordance with various embodiments of the present invention. Circuit 600 includes a multi-port device 610 for receiving read and/or write operations at a first port (port A) and a second port (port B). Multi-port device 610 is capable of performing DDR read/write operations at port A and/or port B. Port A operates based on the clock signal CLK_A, and port B operates based on the clock signal CLK_B. Circuit 600 also includes a detector 620 coupled with the multi-port device 610. Detector 620 is configurable to detect a collision between port A and port B if the same address space is accessed by port A and port B coincidentally. Circuit 600 also includes a signal generator 630 coupled with the detector 620. The signal generator 630 is configurable to assert a BUSY signal at port A and/or port B a number of clock cycles after the detector 620 detects the collision. The detector 620 is then configurable to store an address location of the address space in a memory register (such as in one of memory registers 650). This address location then may later be used, together with the known number of cycles that the BUSY signal was asserted after the collision, to deterministically report the collision.

In various embodiments, the signal generator 630 is configurable to assert a BUSY signal at port A a number of clock cycles after detecting the collision if port A is attempting to read from the address space and port B is attempting to write to the editor space, and vice versa. The signal generator 630 is also configurable to assert a BUSY at both port A and port B a number of clock cycles after detecting the collision if both ports are attempting to write to the address space.

Various embodiments achieve deterministic collision detection through the use of divided clock signals, as described above. Circuit 600 achieves these divided clock signals with pulse generators 641 and 642. Pulse generator 641 generates the pulses DIVCLK1_A and DIVCLK2_A from CLK_A (corresponding to even and odd cycles respectively of port A), and a pulse generator 642 generates the pulses DIVCLK1_B and DIVCLK2_B from CLK_B (corresponding to even and odd cycles respectively of port B). DIVCLK1_A and DIVCLK2_A are complements of each other and have frequencies equal to the frequency of CLK_A divided by 2. DIVCLK1_B and DIVCLK2_B are complements of each other and have frequencies equal to the frequency of CLK_B divided by 2. Moreover, it should be appreciated that divided clock signals may be generated from CLK_A and CLK_B where the frequencies of the divided clocks are equal to the frequencies of CLK_A and CLK_B divided by X and Y respectively, where X and Y are integers greater than or equal to 2.

In various environments, circuit 600 also includes memory registers for 650 for storing address locations corresponding to memory accesses at odd cycles for port A, at even cycles for port A, at odd cycles for port B, and at even cycles for port B. if the address location for either odd or even cycles of port A match with either odd or even cycles of port B, that particular address location then defines the address space used to report the collision.

Figure 7:
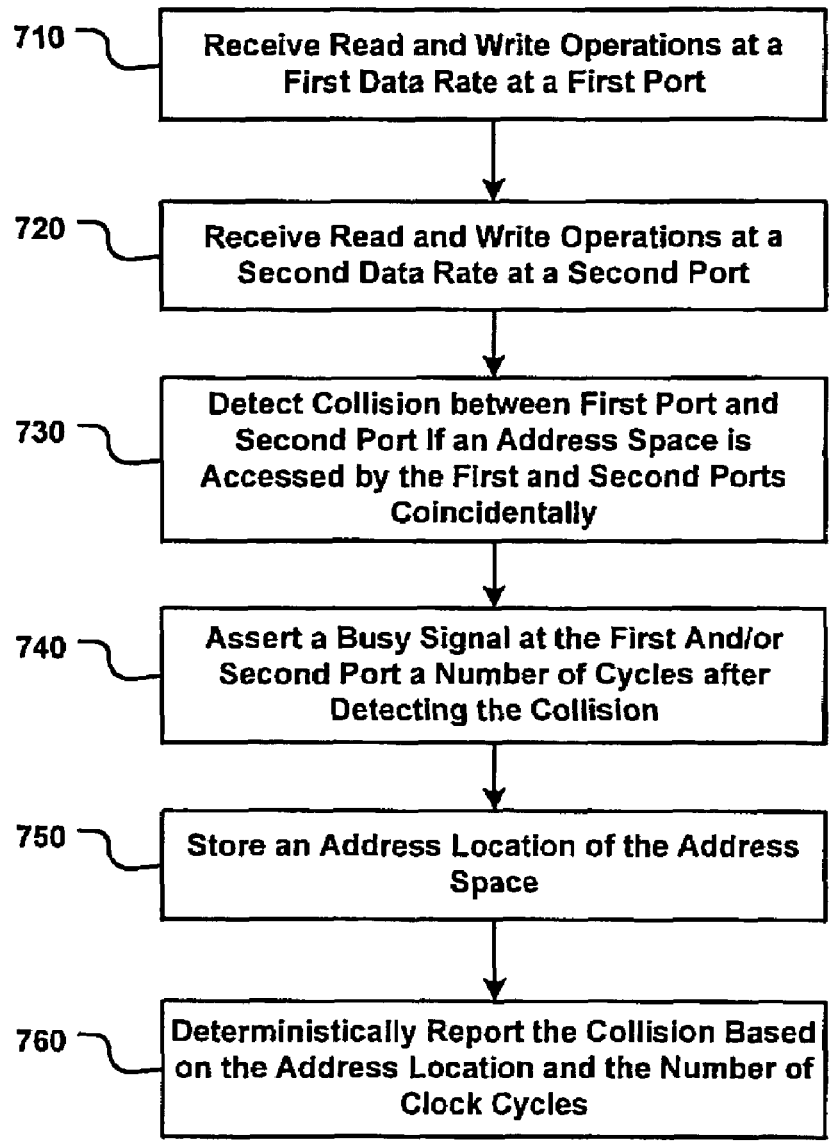
FIG. 7 illustrates a flowchart of an exemplary for deterministic collision detection, in accordance with various embodiments of the present invention.

FIG. 7 illustrates a flowchart of an exemplary process 700 for deterministic collision detection, in accordance with various embodiments of the present invention. Although specific operations are disclosed in process 700, such operations are exemplary. Process 700 may not include all of the operations illustrated by FIG. 7. Also, process 700 may include various other operations and/or variations of the operations shown by FIG. 7. Likewise, the sequence of the operations of process 700 can be modified. At block 710 of process 700, read and write operations are received at a first data rate at a first port of a multi-port device. At block 720, read and write operations are received at a second data rate at a second port of the multi-port device. It is appreciated that the first and second data rates may be SDR or DDR.

Figure 8:
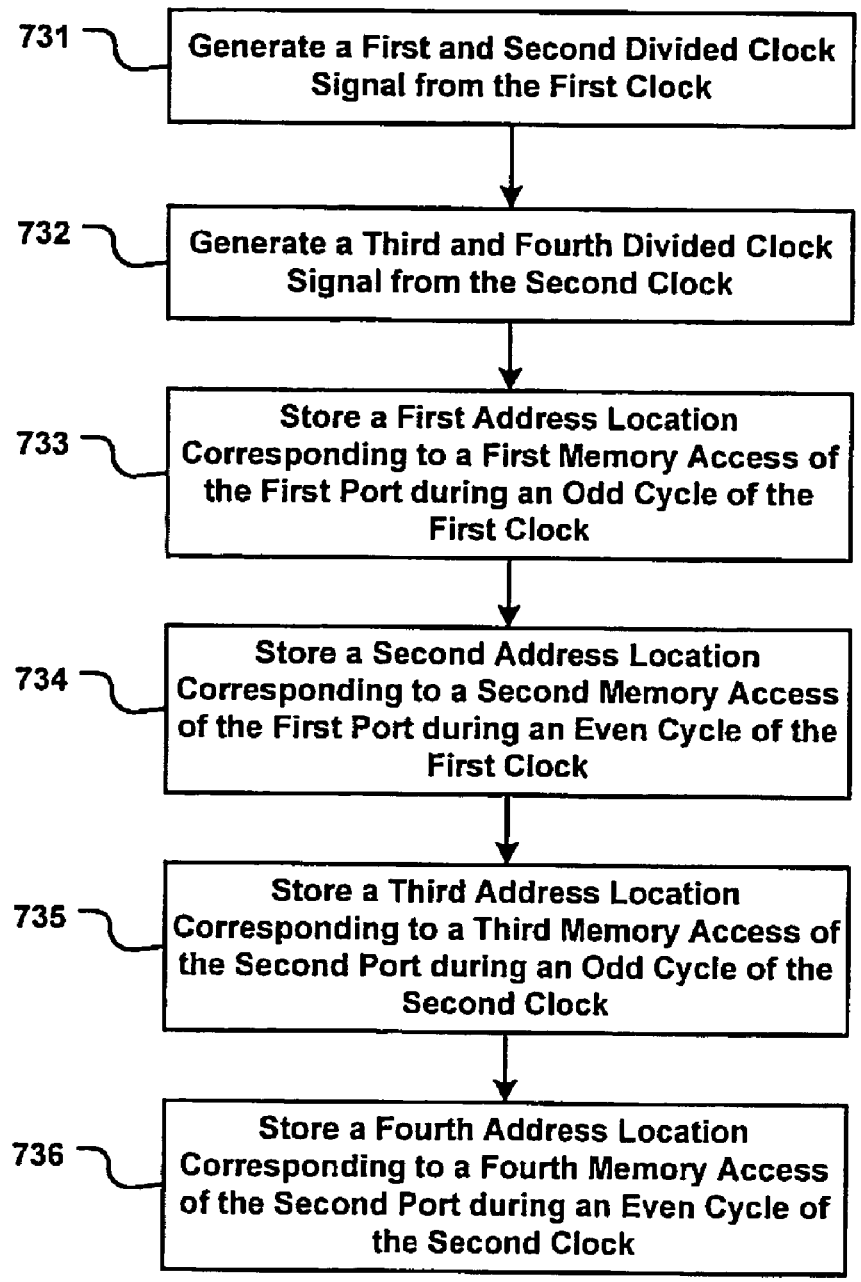
FIG. 8 illustrates a flowchart of an exemplary process for detecting a collision between a first and second port if an address space is accessed by the first and second port constantly, in accordance with various embodiments of the present invention.

At block 730, a collision is detected between the first port and the second port if an address space is accessed by the first and second ports coincidentally. It is appreciated that the operation(s) of block 730 may be achieved in a number of ways. For example, FIG. 8 illustrates a flowchart of one process 730 for detecting a collision between a first and second port if an address space is accessed by the first and second port coincidentally, in accordance with various embodiments of the present invention. Although specific operations are disclosed in process 730, such operations are exemplary. Process 730 may not include all of the operations illustrated by FIG. 8. Also, process 730 may include various other operations and/or variations of the operations shown by FIG. 8. Likewise, the sequence of the operations of process 730 can be modified. At block 731, first and second divided clock signals are generated from a first clock corresponding to the first port. In one embodiment, the first and second divided clock signals are complements of each other and have frequencies equal to the frequency of the first clock divided by X. Similarly, at block 732, third and fourth divided clock signals are generated from a second clock corresponding to the second port. In one embodiment, the third and fourth divided clock signals are complements of each other and have frequencies equal to the frequency of the second clock divided by Y. For X=Y=2, the first and second divided clock signals respectively correspond to odd and even cycles of the first clock, and the third and fourth divided clock signals respectively correspond to odd and even cycles of the second clock.

For blocks 733-736, address locations corresponding to device accesses of both odd and even cycles of the first and second ports are stored. Specifically, a first address location corresponding to a first device access of the first port during an odd cycle of the first clock is stored (block 733); a second address location corresponding to a second device access of the first port during in even a cycle of the first clock is stored (block 734); a third address location corresponding to a third device access of the second port during an odd cycle of the second clock is stored (block 735); and a fourth address location corresponding to a fourth device access of the second port during in even cycle of the second clock is stored (block 736). It is appreciated that additional storing steps may be necessary if X or Y are greater than 2.

Figure 9:
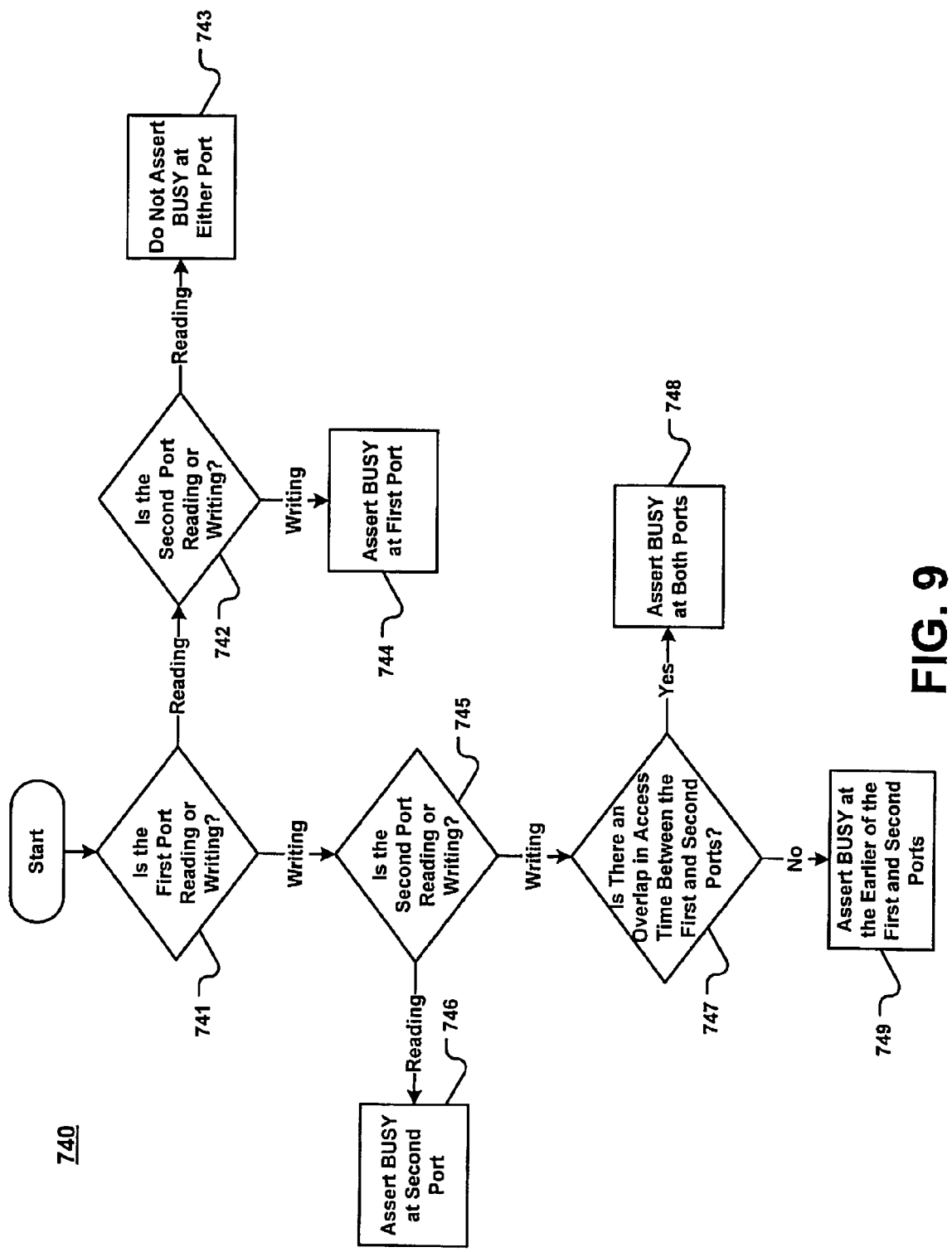
FIG. 9 illustrates a flowchart of an exemplary process for asserting a busy signal at the first and/or second port of a multi-port device by number of cycles after detecting a collision, in accordance with various embodiments of the present invention.

With reference again to FIG. 7, block 740 involves asserting a busy signal at the first and/or second port a number of cycles after detecting the collision. It is appreciated that the operation(s) of block 740 may be achieved in a number of ways. For example, FIG. 9 illustrates a flowchart of one process 740 for asserting a busy signal at the first and/or second port of a multi-port device by number of cycles after detecting a collision, in accordance with various embodiments of the present invention. Although specific operations are disclosed in process 740, such operations are exemplary. Process 740 may not include all of the operations illustrated by FIG. 9. Also, process 740 may include various other operations and/or variations of the operations shown by FIG. 9. Likewise, the sequence of the operations of process 740 can be modified. Process 740 begins at block 741, where a determination is made as to whether the first port is reading or writing. If the first port is reading, process 740 proceeds to block 742, where a determination is made as to whether the second port is reading or writing. If the second port is reading, a busy signal is asserted at neither port (block 743), and if the second port is writing, a busy signal is asserted at the first port (block 744). If it is determined at block 741 that the first port is writing, process 740 proceeds to block 745, where a determination is made as to whether the second port is reading or writing. If the second port is reading, a busy signal is asserted at the second port (block 746). If the second port is writing, process 740 proceeds to block 747, where a determination is made as to whether there is an overlap in access time between the first and second ports. If there is an access time overlap, a busy signal is asserted at both ports (block 748). If not, a busy signal is asserted at the earlier of the two ports (block 749).

With reference again to FIG. 7, block 750 involves storing an address location of the address space where the collision was detected. At block 760, the collision is then deterministically reported based on the stored address location and the number of clock cycles that the busy signal is asserted after the collision.

Thus, embodiments provide technology for deterministic collision detection. Embodiments resolve the issue of meeting the setup time requirement of the next clock cycle of the earlier port. Embodiments detect the cycle time overlap by increasing the high time of each divided clock to account for any skew to the actual memory cells and also account for the minimum pulse width required to set the flag. This ensures a BUSY flag if there is a cycle time overlap. Collisions therefore may then be reported with certainty as to the address locations where they occurred and the particular clock cycles in which they occurred.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of deterministic collision detection involving at least two ports comprising:
   receiving a read/write operation at a first data rate at a first port of a multi-port device;
   receiving a read/write operation at a second data rate at a second port of said multi-port device;
   detecting a collision between said first port and said second port if a same address space is accessed by said first port and said second port coincidentally;
   asserting a busy signal at least one of said first port and said second port a number of clock cycles after detecting said collision;
   storing an address location of said address space in a memory register; and
   deterministically reporting said collision by dividing signals from different clocks for the first and second ports.

2. The method as recited in claim 1 wherein said first and second ports operate based on first and second clocks respectively, and further comprising:
   generating first and second divided clock signals, wherein said first and second divided clock signals are complements of each other and have respective frequencies equal to said first clock divided by X; and
   generating third and fourth divided clock signals, wherein said third and fourth divided clock signals are complements of each other and have respective frequencies equal to said second clock divided by Y.

3. The method as recited in claim 2 wherein said first divided clock signal corresponds to odd cycles of said first clock, wherein further said second divided clock signal corresponds to even cycles of said first clock, wherein further said third divided clock signal corresponds to odd cycles of said second clock, and wherein further said fourth divided clock signal corresponds to even cycles of said second clock.

4. The method as recited in claim 1 wherein said first and second ports operate based on first and second clocks respectively, and further comprising:
   storing a first address location corresponding to a first device access of said first port during an odd cycle of said first clock;
   storing a second address location corresponding to a second device access of said first port during an even cycle of said first clock;
   storing a third address location corresponding to a third device access of said second port during an odd cycle of said second clock; and
   storing a fourth address location corresponding to a fourth device access of said second port during an even cycle of said second clock,
   wherein said address space is defined by said first address location if said first address location matches with one of said third address location and said fourth address location, and further
   wherein said address space is defined by said second address location if said second address location matches with one of said third address location and said fourth address location.

5. A method of deterministically detecting collisions involving at least two ports, the method comprising:
   receiving a first read/write operation at a first data rate at a first port of a multi-port device;
   receiving a second read/write operation at a second data rate at a second port of said multi-port device;
   detecting a collision between said first port and said second port when said first port and said second port are accessing a same address space;
   asserting a busy signal at said first port a number of clock cycles after detecting said collision if said first port is attempting to read from said address space and said second port is attempting to coincidentally write to said address space;
   asserting a busy signal at said first port and said second port a number of clock cycles after detecting said collision if said first port is attempting to write to said address space and said second port is attempting to coincidentally write to said address space; and
   provided any port has been asserted busy:
   storing an address location of said address space in a memory register; and deterministically reporting said collision using said address location and by dividing signals from different clocks for the first and second ports.

6. The method according to claim 5 each first and second read/write operations occur during a single clock cycle and having respective clocks, wherein further said clock cycles comprise respective device access periods and respective device recovery periods, and further comprising:
   asserting said BUSY signal at said first port a number of clock cycles after detecting said collision if said first port is in its respective device recovery period of writing to said address space and said second port is in its respective device access period of writing to said address space.

7. The method according to claim 5 wherein no busy signal is asserted at said first port and said second port in response to detecting said collision if said first port is attempting to read from said address space and said second port is attempting to read from said address space.

8. The method according to claim 5 wherein no busy signal is asserted at said second port in response to detecting said collision if said first port is attempting to read from said address space and said second port is attempting to write to said address space.

9. The method according to claim 5 wherein said first and second ports operate based on first and second clocks respectively, and further comprising:
   generating first and second divided clock signals, wherein said first and second divided clock signals are complements of each other and have respective frequencies equal to said first clock divided by X; and
   generating third and fourth divided clock signals, wherein said third and fourth divided clock signals are complements of each other and have respective frequencies equal to said second clock divided by Y.

10. The method as recited in claim 9 wherein said first divided clock signal corresponds to odd cycles of said first clock, wherein further said second divided clock signal corresponds to even cycles of said first clock, wherein further said third divided clock signal corresponds to odd cycles of said second clock, and wherein further said fourth divided clock signal corresponds to even cycles of said second clock.

11. The method according to claim 5 wherein said first and second ports operate based on first and second clocks respectively, and further comprising:
   storing a first address location corresponding to a first device access of said first port during an odd cycle of said first clock;
   storing a second address location corresponding to a second device access of said first port during an even cycle of said first clock;
   storing a third address location corresponding to a third device access of said second port during an odd cycle of said second clock; and
   storing a fourth address location corresponding to a fourth device access of said second port during an even cycle of said second clock,
   wherein said address space is defined by said first address location if said first address location matches with one of said third address location and said fourth address location; and further
   wherein said address space is defined by said second address location if said second address location matches with one of said third address location and said fourth address location.

12. A circuit for detecting collisions involving at least two ports, said circuit comprising:
   a multi-port device for receiving read and write operations at a first port and a second port at a first data rate and a second data rate respectively;
   a detector coupled to said multi-port device, said detector for detecting a collision between said first port and said second port if a same address space is accessed by said first port and said second port coincidentally; and
   a signal generator coupled to said detector, said signal generator for asserting a busy signal at least one of said first port and said second port a number of clock cycles after detecting said collision, wherein said detector is also for storing an address location of said address space in a memory register and for deterministically reporting said collision using said address location and by dividing signals from different clocks for the first and second ports.

13. The circuit as recited in claim 12 wherein said first and second ports operate based on first and second clocks respectively, and further comprising:
a first pulse generator for generating first and second divided clock signals, wherein said first and second divided clock signals are complements of each other and have respective frequencies equal to said first clock divided by X; and
a second pulse generator for generating third and fourth in divided clock signals, wherein said third and fourth divided clock signals are complements of each other and have respective frequencies equal to said second clock divided by Y.

14. The circuit as recited in claim 13 wherein said first divided clock signal corresponds to odd cycles of said first clock, wherein further said second divided clock signal corresponds to even cycles of said first clock, wherein further said third divided clock signal corresponds to odd cycles of said second clock, and wherein further said fourth divided clock signal corresponds to even cycles of said second clock.

15. The circuit as recited in claim 12 wherein said first and second ports operate based on a first and second clock respectively, said circuit further comprising:
memory registers for storing a first address location corresponding to a first device access of said first port during an odd cycle of said first clock, for storing a second address location corresponding to a second device access of said first port during an even cycle of said first clock, for storing a third address location corresponding to a third device access of said second port during an odd cycle of said first clock, and for storing a fourth address location corresponding to a fourth device access of said second port during an even cycle of said first clock,
wherein said first address location defines said address space for said detector if said first address location matches with one of said third address location and said fourth address location; and further
wherein said second address location defines said address space for said detector if said second address location matches with one of said third address location and said fourth address location.

16. A circuit for detecting collisions involving at least two ports comprising:
a multi-port device for receiving read and write operations at a first port and a second port at a first data rate and a second data rate respectively;
a detector coupled to said multi-port device, wherein said detector detects a collision between said first port and said second port if a same address space is accessed by said first port and said second port coincidentally; and
a signal generator coupled to said detector, said signal generator for asserting a busy signal at said first port a number of clock cycles after detecting said collision if said first port is attempting to read from said address space and said second port is attempting to coincidentally write to said address space, said signal generator also for asserting a busy signal at said first port and said second port said number of clock cycles after detecting said collision if said first port is attempting to write to said address space and said second port is attempting to coincidentally write to said address space,
wherein said detector is also for storing an address location of said address space and said number of clock cycles in said multi-port device provided any port has been asserted busy, said detector also for deterministically reporting said collision using said address location and by dividing signals from different clocks for the first and second ports.

17. The circuit according to claim 16 wherein said first and second ports operate based on first and second clocks respectively, wherein further respective cycles of said first and second clocks comprise respective device access periods and device recovery periods, and wherein further said signal generator is for asserting said BUSY signal at said first port a number of clock cycles after detecting said collision if said first port is in its respective device recovery period of writing to said address space and said second port is in its respective device access period of writing to said address space.

18. The circuit according to claim 16 wherein said signal generator does not assert a busy signal at said second port in response to detecting said collision if said first port is attempting to read from said address space and said second port is attempting to write to said address space.

19. The circuit according to claim 16 wherein said signal generator does not assert a busy signal at said first port and said second port in response to detecting said collision if said first port is attempting to read to said address space and said second port is attempting to read to said address space.

20. The circuit according to claim 16 wherein said first and second ports operate based on first and second clocks respectively, and further comprising:
a first pulse generator for generating first and second divided clock signals, wherein said first and second divided clock signals are complements of each other and have respective frequencies equal to said first clock divided by X; and
a first pulse generator for generating third and fourth divided clock signals, wherein said third and fourth divided clock signals are complements of each other and have respective frequencies equal to said second clock divided by Y.

21. The circuit as recited in claim 20 wherein said first divided clock signal corresponds to odd cycles of said first clock, wherein further said second divided clock signal corresponds to even cycles of said first clock, wherein further said third divided clock signal corresponds to odd cycles of said second clock, and wherein further said fourth divided clock signal corresponds to even cycles of said second clock.

22. The circuit according to claim 16 wherein said first and second ports operate based on first and second clocks respectively, said circuit further comprising:
memory registers for storing a first address location corresponding to a first device access of said first port during an odd cycle of said first clock, for storing a second address location corresponding to a second device access of said first port during an even cycle of said first clock, for storing a third address location corresponding to a third device access of said second port during an odd cycle of said first clock, and for storing a fourth address location corresponding to a fourth device access of said second port during an even cycle of said first clock;
wherein said first address location defines said address space for said detector if said first address location matches with one of said third address location and said fourth address location;
wherein said second address location defines said address space for said detector if said second address location matches with one of said third address location and said fourth address location.

* * * * *